United States Patent [19]
Emmett

[11] 4,383,046
[45] May 10, 1983

[54] REGENERATION OF ION EXCHANGE MATERIALS

[75] Inventor: James R. Emmett, Brewood, England

[73] Assignee: Northern Engineering Industries Ltd., Newcastle upon Tyne, England

[21] Appl. No.: 350,561

[22] Filed: Feb. 22, 1982

[30] Foreign Application Priority Data

Mar. 5, 1981 [GB] United Kingdom ............... 8106965

[51] Int. Cl.³ .............................................. B01J 49/00
[52] U.S. Cl. ....................................... 521/26; 210/662; 210/675; 210/746; 210/96.1; 210/189; 209/496
[58] Field of Search ................. 521/26; 210/662, 675, 210/676, 678, 686, 739, 746, 96.1, 189, 269; 209/496

[56] References Cited

U.S. PATENT DOCUMENTS

2,617,766 11/1952 Emmett ................................. 521/26
4,264,439 4/1981 Lefevre ............................... 210/662
4,298,696 11/1981 Emmett ............................... 210/189

FOREIGN PATENT DOCUMENTS

2060430 5/1981 United Kingdom ............... 210/677

*Primary Examiner*—Ernest G. Therkorn

[57] ABSTRACT

In mixed bed ion exchange resin regeneration processes, transfer of resin after classification is controlled by detecting a change in a parameter of transfer water dependent on ion concentration, e.g. conductivity. The process includes increasing the ion concentration of the transfer water. The increased ion concentration ensures that large percentage uncontrolled fluctuations in the conductivity of the water do not mask the change required to be detected. The ion concentration can be increased by adding, for example, decationized water to the transfer water.

8 Claims, 1 Drawing Figure

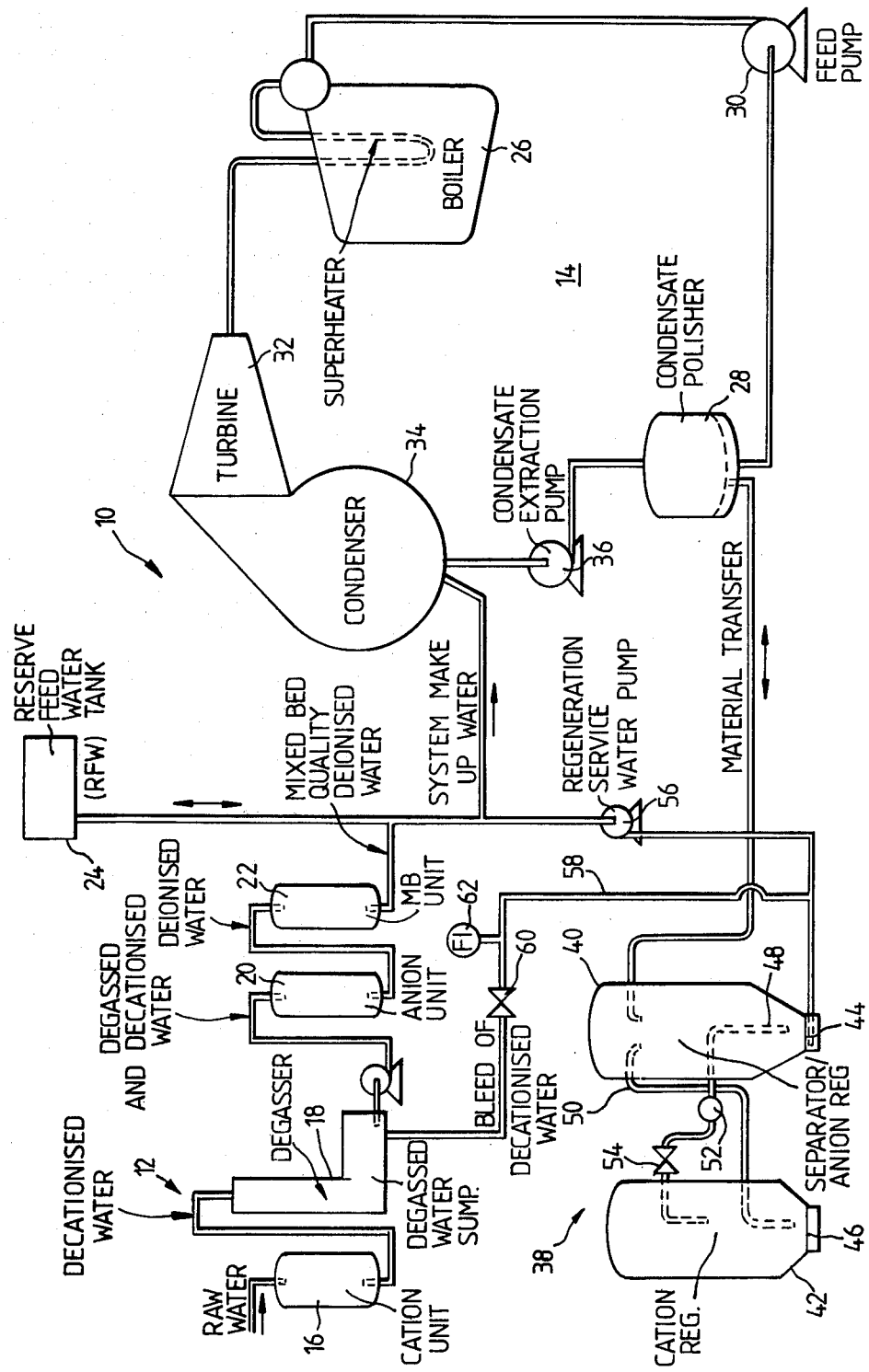

REGENERATION OF ION EXCHANGE MATERIALS

BACKGROUND OF THE INVENTION

The invention relates to the regeneration of ion exchange materials.

In water treatment plant, for example boiler water treatment plant including mixed-bed condensate polishers, deionised water is used for the transfer, washing and rinsing operations during regeneration of the condensate polisher ion exchange materials. The regeneration of the materials is usually performed externally of the polisher service vessel. The deionised water for the regeneration operations is taken, for example, from the boiler feed water make-up supply, the final stage of which supply is commonly a mixed-bed deionisation unit.

In each regeneration cycle, for example, exhausted ion exchange materials are classified into layers by backwashing. Next, the materials are separated by a transfer flow of water to pass one type at least to a separate vessel. A very effective way, for example, of controlling the transfer stage is described in U.S. Pat. No. 4,298,696 J. R. Emmett, patented Nov. 3, 1981 in which the conductivity of the transfer flow is monitored to determine when the last of one type, say cation material for example, has left the classifier.

The conductivity of the transfer water is very low indeed so that only extremely slight changes in conditions can cause the conductivity to change by several hundred percent.

In the instance of transfer water derived from a boiler feed water make-up supply, as the ion exchange materials in the mixed-bed make-up unit become exhausted, the ion concentration of the feed water changes. Additionally, in such a system, water from the make-up supply is stored in a storage tank. The water in the tank absorbs carbon dioxide and other gases to a degree dependent on time and temperature, for example, and when the water for the regeneration of the condensate polisher is changed from the normal flow from the mixed-bed make-up unit to flow from the storage tank, the ion concentration of the water for the condensate polisher regeneration changes.

Such changes although small in absolute terms may cause a parameter such as conductivity, for example, which is dependent on ion concentration, to change by as much as 600%. The changes are variable, so that in successive regeneration cycles the conductivity, for example, of the transfer water is unknown and may lie anywhere between a lower value and a higher value which have a ratio of as much as 1:6. Such spurious and uncontrolled changes in ion concentration are due generally to what may be termed "source changes" affecting the ion concentration of the water before the water is used to transfer ion exchange material.

Such wide percentage variation in the conductivity of the transfer water itself would mask the change in effective conductivity of the transfer flow which is required to be detected in order to indicate thaat the material being transferred in the water has changed from one type to the other.

The object of the invention is to eliminate or render negligible the effect of spurious uncontrolled source changes on the ion concentration of the transfer water.

BRIEF SUMMARY OF THE INVENTION

According to the invention, in a method of regnerating exhausted mixed ion exchange materials in which after classification in a vessel material is transferred from the vessel by flow of transfer water and a parameter dependent on the ion concentration of the transfer water is monitored the improvement comprising increasing the ion concentration of the water used for transfer flow so that detection of the change of ion exchange material type being transferred in successive cycles of regeneration is repeatable independently of prejudicial effects arising from spurious uncontrolled source changes in the water.

Also according to the invention, apparatus for regenerating mixed bed ion exchange materials comprises:
(i) at least first and second vessels each containing in a lower region thereof a respective perforate barrier to retain ion exchange material thereon;
(ii) a conduit having a first end adjacent said perforate barrier of said first vessel and having a second end in said second vessel above said perforate barrier thereof;
(iii) first supply means by which an upward flow of water can be established within said first vessel to classify materials therein and by which transfer water can be passed into said first vessel and upwardly through said barrier to maintain water therein while water flows out of the vessel through said conduit as part of a transfer flow of water and material from the vessel;
(iv) a detector means located intermediate the ends of said conduit for monitoring a parameter dependent on ion concentration of the transfer water;
(v) a source of an aqueous solution of a reagent;
(vi) second supply means connecting said source to said first supply means so that said solution can be added to the transfer water to increase the ion concentration thereof so that detection by said detector means of the change of ion exchange material type being transferred in successive cycles of regeneration is repeatable independently of prejudicial effects arising from spurious uncontrolled source changes in the water; and
(vii) valve means in said conduit arranged to close to isolate said ends of the conduit in response to detection of said change.

BRIEF DESCRIPTION OF THE DRAWINGS

A method of regeneration ion exchange materials and apparatus for performing the method will now be described by way of example to illustrate the invention with reference to the accompanying drawing which shows diagrammatically a steam power-generating system.

DESCRIPTION OF THE INVENTION

The power-generation system 10 has a water-treatment plant comprising feed water pre-treatment apparatus 12 and one or more mixed bed condensate polishers in a closed water/steam circulation loop 14.

The feed water pre-treatment apparatus 12 typically consists of a cation ion exchange resin unit 16, a degasser 18, an anion ion exchange resin unit 20 and a mixed-bed ion exchange make-up unit 22. Deionised water can be fed from the unit 22 directly to the circulation loop 14 or to a reserve tank 24 from which make-up water for the loop 14 can be drawn. The ion exchange materials are typically regenerated in their respective units.

The circulation loop 14 has a boiler 26 to which feed water is supplied from a mixed-bed condensate-polishing unit 28 via pump 30. Only one unit is shown but usually three such units are provided, two operating alternately and a third being a standby unit. The boiler 26 supplies steam to a steam turbine 32. The turbine 32 is connected to a steam condenser unit 34 which supplies boiler feed water via pump 36 to the condensate polisher 28.

Make-up water from the apparatus 12 is fed to the condenser unit 34 as required by the controls of the system 10 to maintain the amount of boiler feed water in the loop 14 at the required level.

The mixed ion exchange materials from the condensate polisher 28 are transferred to a regeneration station 38 for regeneration. The regeneration station 38 is substantially as described in U.S. Pat. No. 4298696 and is shown here in simplified form. The station 38 has a separator and anion regenerator vessel 40 and a cation regenerator vessel 42 each having a lower perforate barrier 44 and 46, respectively. An elongate conduit 48 has an inlet in the vessel 40 adjacent the barrier 44 and an outlet in the vessel 42. A similar conduit 50 has an inlet in the vessel 42 and an outlet in the vessel 40.

The conduit 48 is provided with conductivity cell 52 for controlling the transfer of material out of the vessel 40 and a valve 54 for isolating the outlet from the inlet of the conduit 48.

Water for backwashing, classifying, transferring and rinsing is supplied to the regeneration station 38 via a pump 56 from the apparatus 12, either directly from the mixed-bed unit 22 or from the reserve tank 24. Water is also supplied by pipes (not shown) from the apparatus 12 to the conduit 48 to enable the conduit 48 to be flushed on either side of the valve 54 to clear the conduit 48 of resin.

A line 58 is used to connect the sump of the degasser 18 to the water-input side of the regeneration station 38. A valve 60 is set to give a desired flow through line 58, which flow can be monitored, for example by a flow indicator 62.

The condensate polisher 28 can contain cation and anion ion exchange materials or those materials and an inert resin material. As described in U.S. Pat. No. 4298696 the inert material is selected to have a particle size and density such that upon classification it forms a layer intermediate the anion and cation materials.

When it is necessary to regenerate the materials in the condensate polisher 28, the materials are transferred to vessel 40 at the regeneration station 38 using deionised water from the apparatus 12. Once in the vessel 40, the materials are subjected to a vigorous backwash after which a lower flow of water is used to classify the materials into an upper anion material layer, an intermediate layer of mixed anion and cation materials and a lower cation material layer. If inert material is present, the intermediate layer between the anion and cation materials consists substantially of inert material.

After classification, cation material is transferred from the vessel 40 through conduit 48 to vessel 42 by transfer water supplied from the apparatus 12 so that it can be regenerated separately from the anion material. Throughout the transfer step the valve 60 is open so that a small flow of decationised water (i.e. the water is, in effect, slightly acidic) is added to the deionised transfer water supplied from the apparatus 12. The effect of adding decationised water to the transfer water is to increase the ion concentration of the transfer water.

The effective conductivity of the flow through the conduit 48 is dependent on the combined conductivities of the cation material and the transfer water. That effective conductivity is in turn dependent on the ion concentration of the transfer water as determined by the ion concentration of the added decationised water. Since the decationised water has already passed over cation material, in the unit 16, the presence of the cation material in the transfer water in the conduit 48 does not cause any substantial change in the ion concentration of the transfer water in the conduit and the resultant effective conductivity of the total flow in the conduit is relatively high.

However, when anion material starts to pass through the cell 52 (either as part of the mixed-materials intermediate layer or following in train after inert material of the intermediate layer has passed through the cell), the effective conductivity falls to a relatively low value. That is because the anion material interacts with the anions in the decationised water to reduce the ion concentration of the transfer water. The cell 52 detects the resultant fall in effective conductivity.

Thus, a relatively large change in effective conductivity is detected by the cell 52 when sufficient anion material passes and is used to initiate the isolation of the outlet of the conduit 48 from the inlet thereof by closing the valve 54. The precise moment of closure of the valve 54 depends on the position of the cell 52 and on whether inert material is present. If necessary, a timer is used to delay the closure following detection of the change in conductivity. Generally, the transfer is continued until at least a major proportion of the cation material has passed through the outlet and a major proportion of material from the intermediate layer has entered the inlet of the conduit 48.

The change in effective conductivity which is detected by the cell 52 is largely dependent on the change in conductivity of the transfer water as the material passing through the cell 52 changes.

The change in effective conductivity which is detected depends, if at all, only to a minor degree on the difference between the conductivities of the cation and anion or between either of those and the conductivity of inert resin.

Following isolation of the outlet from the inlet of the conduit 48, several options are abailable (see U.S. Pat. No. 4298696). Typically, the intermediate layer is isolated in the conduit 48 during regeneration or is transferred to a separate vessel for isolation during regeneration.

The cation and anion materials are then regenerated in their respective vessels 42 or 40. After the materials have been rinsed with deionised water, the regenerated cation material is transferred through conduit 50 to the vessel 40 and is mixed with the regenerated anion material. The mixed materials are then transferred back to the condensate polisher 28.

Typically, without the addition of decationised water, the conductivity of transfer water transferring cation material is 0.8 $\mu$S/cm and of transfer water transferring anion material is 0.25 $\mu$S/cm. The deionised transfer water typically has a conductivity of about 0.2 $\mu$S/cm but, as previously mentioned, various uncontrolled factors may increase the conductivity to 1 $\mu$S/cm and higher. Such small, but high percentage, changes mask or prevent detection of the change in conductivity caused by the change in the type of material passing the cell 52 in successive regeneration cycles.

In a test on an actual system, transfer water was used at a rate of approximately 8 m$^3$/hr. Decationised water was added to the transfer water, as proposed by the present invention, at a rate of about 0.08 m$^3$/hr. For the particular raw water supplied to the apparatus 12, that was equivalent to a resultant acidity of 1 mg/l of acid (expressed as CaCO$_3$) in the transfer water. The resultant conductivity of the transfer water when transferring cation material was approximately 7 $\mu$S/cm and when transferring anion material approximately 0.2 $\mu$S/cm.

Such a large change in conductivity is readily detected without the need for re-setting of the "set point" of the cell 52, and any spurious fluctuations in the conductivity of the transfer water are always of minor magnitude compared with the conductivity imposed by the addition of the decationised water.

Tests conducted on both pilot and actual systems have shown that, with the addition of decationised water to the transfer water, the response of the cell to the arrival of anion material is very sensitive and rapid so that the control of the valve is very positive and effective.

Possible modifications are, for example, transferring anion material to a different vessel for regeneration or passing regenerated materials to a storage vessel instead of to the unit 28.

The flow rate of the decationised water depends on its acidity. The rate can be selected to give an acidity of approximately 1 mg/l of acid (expressed as CaCO$_3$) in the transfer water, although the level of acidity can be varied depending on the desired level of change in conductivity.

As decationised water is readily available in such systems, it is the preferred source of ions for addition to the transfer water. However, instead of using decationised water, an acid solution may be added to the transfer water. Alternatively, an alkaline solution, such as sodium hydroxide solution or water which has been passed through an anion ion exchange material may be added. If that instance, the conductivity of the water, as cation material is transferred, would be relatively low and the conductivity as anion material is transferred would be relatively high. In further alternatives, raw water which has been softened (to avoid magnesium hydroxide precipitate) or having an initial low total dissolved solids content could be added to the transfer water. In either case both cations and anions would thus be added to the transfer water. It is believed that there would be a sufficient change in effective conductivity to be detected.

Instead of conductivity, the parameter detected may be pH, in which case the cell 52 would be replaced by, for example, a flow-type pH cell. A small sample flow of water devoid of resin material would be taken from the conduit 48 and passed through the cell.

In another modification, a small sample flow of water devoid of resin material could be taken from the conduit 48 and passed through a conductivity cell, instead of the cell being located in the conduit.

What I claim is:

1. In a method of regenerating mixed ion exchange materials in which after classification in a vessel material is transferred from the vessel by flow of transfer water and a parameter dependent on the ion concentration of the transfer water is monitored the improvement comprising increasing the ion concentration of the water used for transfer flow so that detection of the change of ion exchange material type being transferred in successive cycles of regeneration is repeatable independently of prejudicial effects arising from spurious uncontrolled source changes in the water.

2. A method according to claim 1, in which the parameter is conductivity.

3. A method according to claim 1, in which an aqueous solution of a reagent is added to the transfer water to increase the ion concentration of the transfer water.

4. A method according to claim 3, in which said solution is water which has been passed through one type of ion exchange material.

5. A method according to anyone of claims 1-4, in which the transfer water has a resultant acidity which is approximately 1 mg/l of acid (expressed as CaCO$_3$).

6. Apparatus for regenerating mixed bed ion exchange materials comprising:
   (i) at least first and second vessels each containing in a lower region thereof a respective perforate barrier to retain ion exchange material thereon;
   (ii) a conduit having a first end adjacent said perforate barrier of said first vessel and having a second end in said second vessel above said perforate barrier thereof;
   (iii) first supply means by which an upward flow of water can be established within said first vessel to classify materials therein and by which transfer water can be passed into said first vessel and upwardly through said barrier to maintain water therein while water flows out of the vessel through said conduit as part of a transfer flow of water and material from the vessel;
   (iv) a detector means located intermediate the ends of said conduit for monitoring a parameter dependent on ion concentration of the transfer water;
   (v) a source of aqueous solution of a reagent;
   (vi) second supply means connecting said source to said first supply means so that said solution can be added to the transfer water to increase the ion concentration thereof so that detection by said detector means of the change of ion exchange material type being transferred in successive cycles of regeneration is repeatable independently of prejudicial effects arising from spurious uncontrolled source changes in the water; and
   (vii) valve means in said conduit arranged to close to isolate said ends of the conduit in response to detection of said change.

7. Apparatus according to claim 6, in which the detector means comprises a conductivity cell.

8. Apparatus according to claim 6 or 7, in which said solution is water which has been passed through one type of ion exchange material.

* * * * *